Feb. 10, 1948. W. E. URSCHEL 2,435,762
MACHINE FOR REMOVING THE END OF AN ELONGATED FOOD ARTICLE
Filed Oct. 9, 1944 4 Sheets-Sheet 2

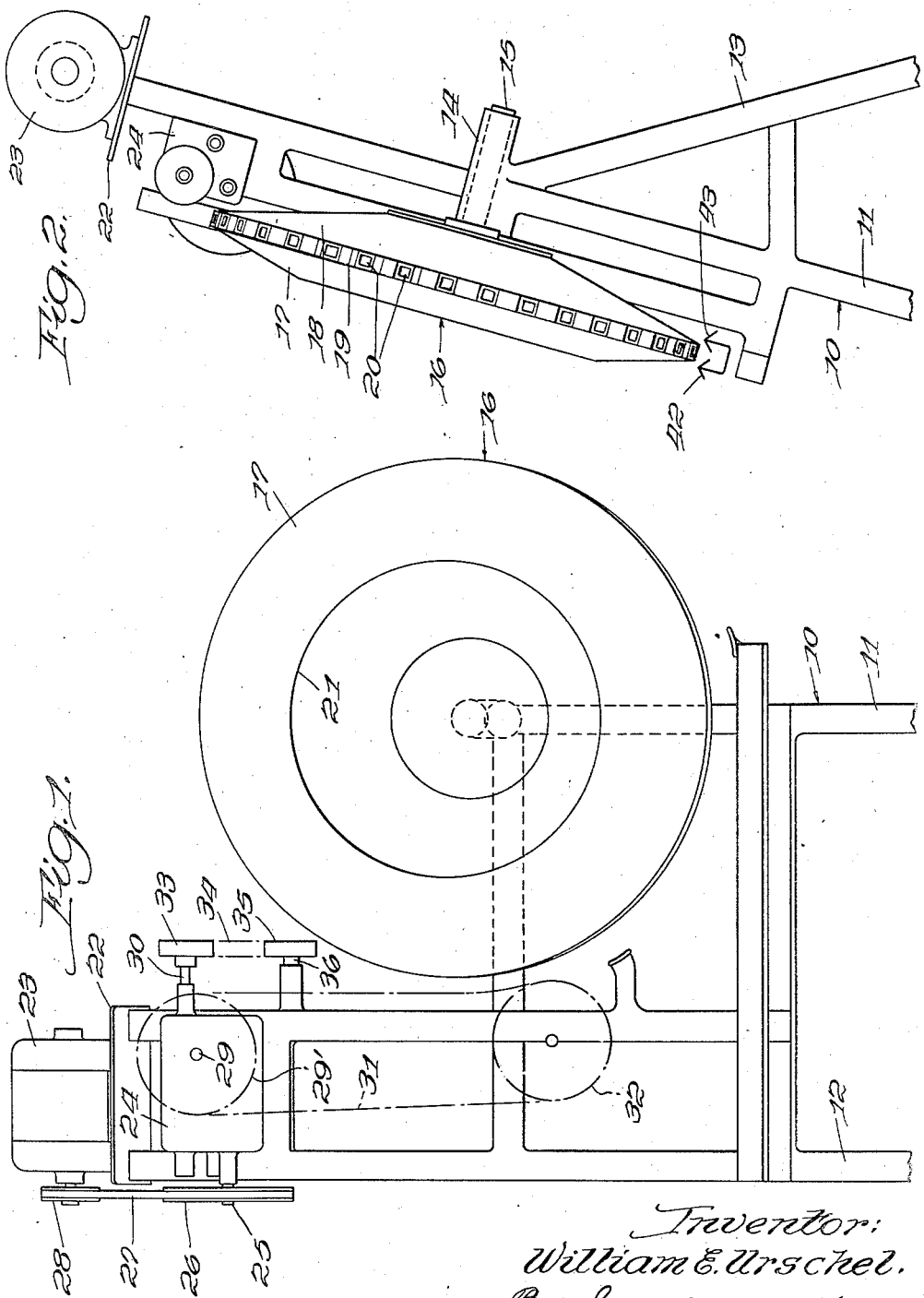

Inventor:
William E. Urschel.
By Stone, Artman & Bisson Attys.

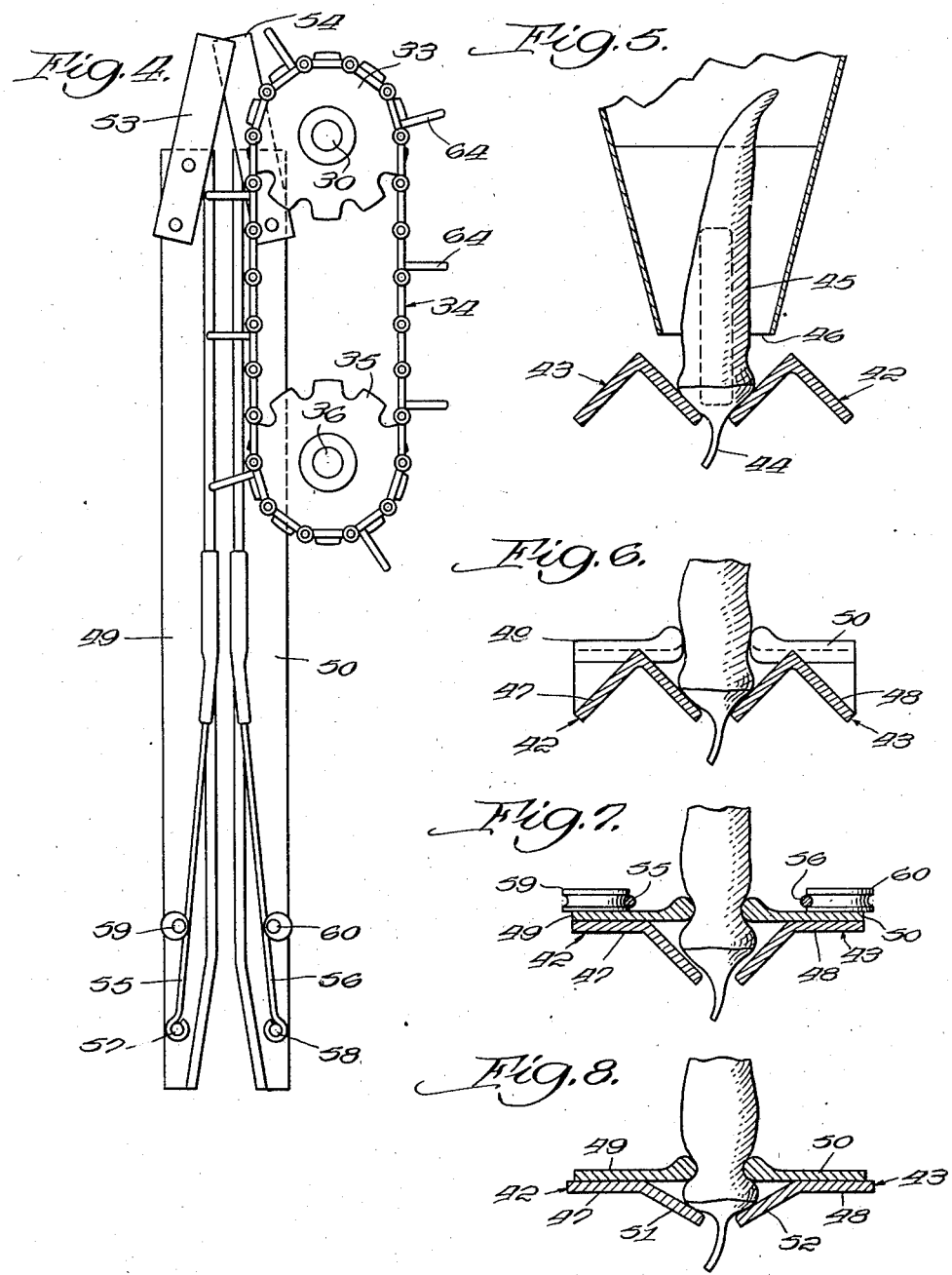

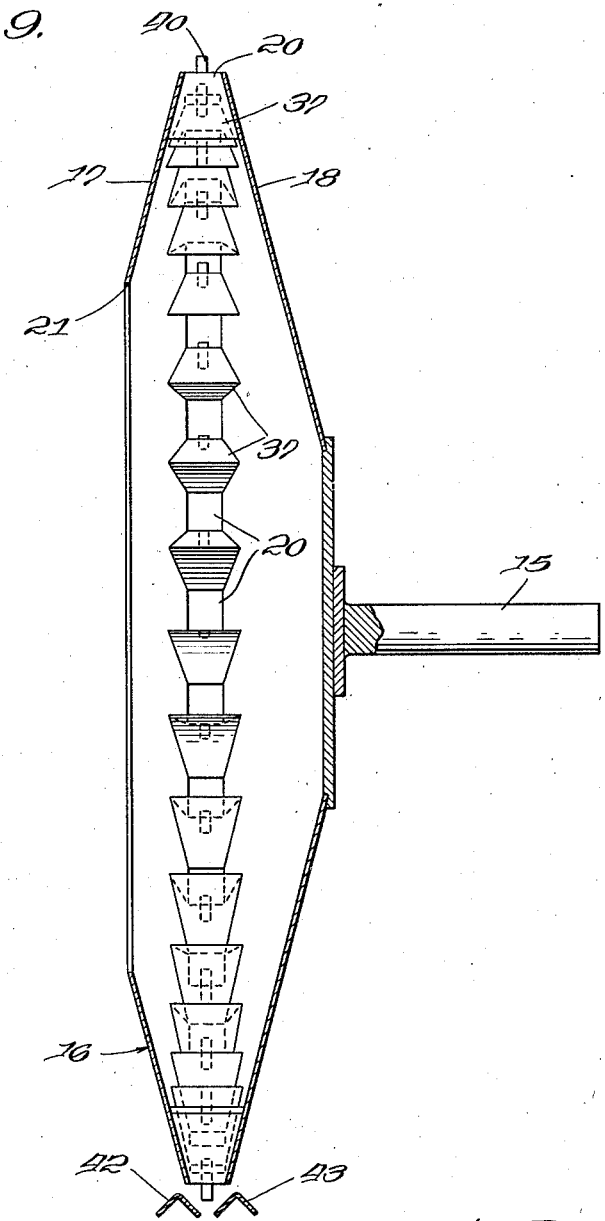

Patented Feb. 10, 1948

2,435,762

UNITED STATES PATENT OFFICE 2,435,762

MACHINE FOR REMOVING THE ENDS OF ELONGATED FOOD ARTICLES

William E. Urschel, Valparaiso, Ind.

Application October 9, 1944, Serial No. 557,767

11 Claims. (Cl. 146—81)

The subject of this invention is a machine for trimming okra pods. However, inasmuch as the okra pod is somewhat compressible and has an elongated shape with a head at one end only, a machine capable of automatically removing okra heads may readily be adapted to perform a similar function for other food products of similar characteristics and shape such as fish and shrimp. The invention, therefore, may be described in more general terms, as a machine for removing the end portions of elongated food articles.

An okra pod has a general shape when hanging vertically similar to that of a carrot excepting that it has a definitely pronounced head at the stem end. Its structure is not stiff but quite flexible. When held by one end, the other end will droop. The chief use of okra is as a base in soups and when so used the entire pod is edible excepting the hard head. In growing, the pods stand upright on stems of the plant and when harvested the pod normally has the head and a short length of stem on it.

The general object of this invention is to provide a machine which will receive a quantity of unassorted okra pods and automatically sever the short stem and head from the pod. Attaining this object involves the steps of arranging the pods so that their heads are all aligned with a knife. Broken down, the process comprises apparatus to perform three steps: firstly, the step of laying the pods in substantially parallel relationship with each other irrespective of whether the heads are on one side or on the other side; secondly, the step of withdrawing from the sorter just those pods that have the head lying in a desired direction; and thirdly, the steps of moving those pods up to a knife for removing the hard head with as little of the edible part of the pod as possible.

The first object of this invention is to provide means for positioning the pods in substantially parallel relationship and in a single line, irrespective of the direction of the head. This is attained by using a rotating drum having peripheral openings for permitting the protrusion of one pod only from each opening. This drum bears similarities to the device utilized in applicant's United States Patent No. 1,814,983, granted July 14, 1931.

The second object of this invention is to provide a simplified means for withdrawing from the pockets of the drum only those okra pods that have their heads outwardly projecting, and as a corollary to this objective, of positively returning to the inside of the drum those okra pods which have their ends inwardly directed. In attaining this object, applicant withdraws the desired okra pods from the drum at a position where the okra pod is lying substantially horizontally within the pocket. At this point, a pod will be lying comparatively still and unaffected by the tumbling of the other pods in the lower part of the drum.

A third object of this invention is to move the selected pods for beheading to a knife by a driving element which does not require a separate holding means for each pod. This is an important feature of this invention and should be compared with the prior art including applicant's earlier patent. When the means for sorting the pods to be beheaded has performed its function, it is necessary to convey each pod to the knife where the beheading takes place. It is apparent, therefore, that each pod to be beheaded must be held and in the past a movable separate means for holding each pod has been provided. This results in a comparatively complicated mechanical structure. A major feature of the present device resides in the use of a pair of gripping rails between which the head end of the okra pod may be inserted. These gripping rails are not quite parallel so that at one end, the head of the pod may readily be inserted while at the other end, they will squeeze the okra pod lengthwise of these gripping rails until a knife is reached. Individual holding means for each pod are unnecessary.

There are other less important objects. One is to hold the horizontally disposed pods in horizontal position during the cutting operation. This is obtained by an auxiliary conveyor called a straightener conveyor. Other objects and features may appear in the description of the embodiment of the invention hereinafter described in conjunction with four sheets of drawings comprising:

Figure 1 is a schematic front view of the device;

Figure 2 is a schematic side view of the device;

Figure 4 is a side view of the straightener chain and the rejector fingers;

Figure 3:
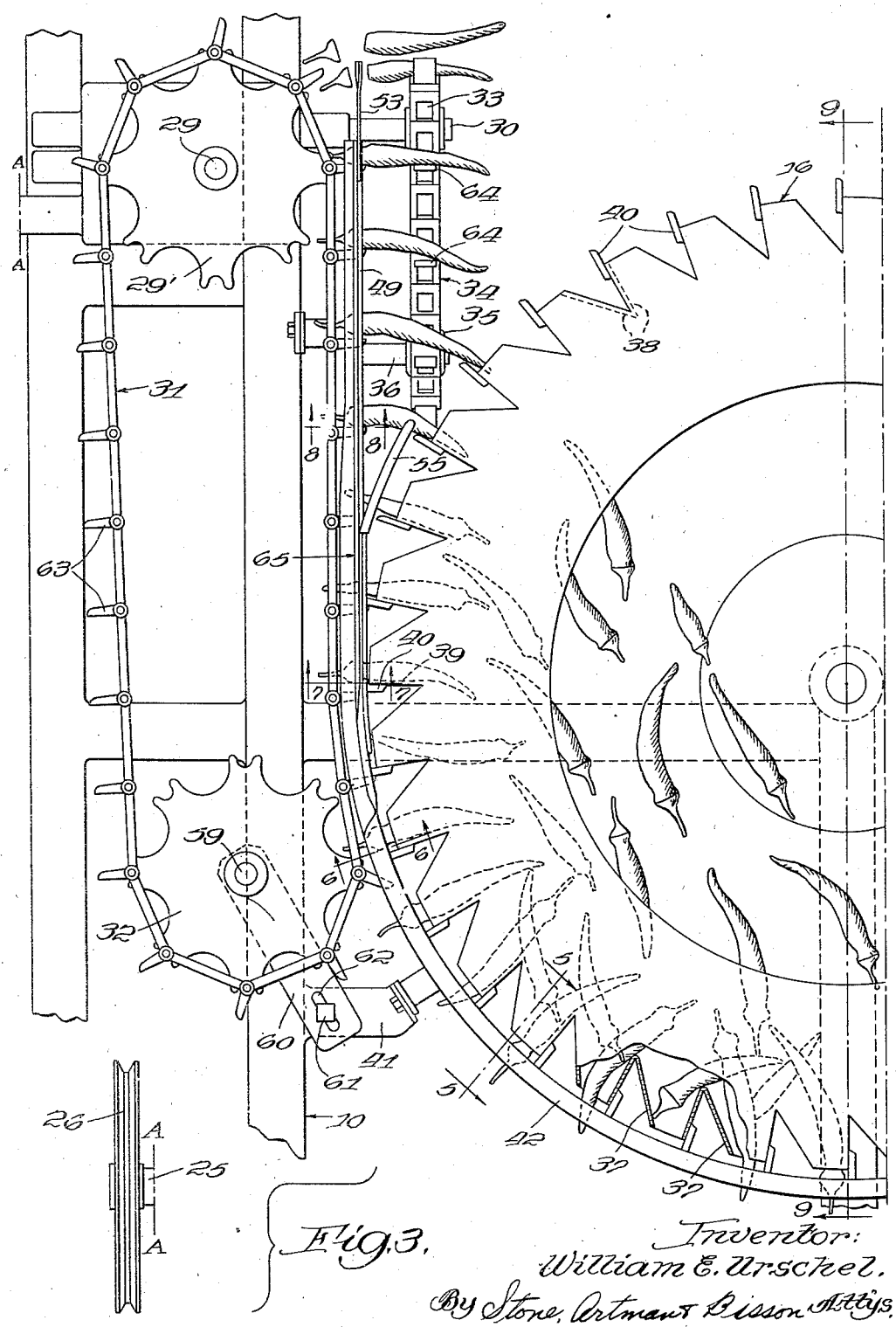
Figure 3 is an enlarged view of a portion of the front of the device.

Figures 5, 6, 7 and 8 are views taken on the lines 5—5, 6—6, 7—7 and 8—8 of Figure 3 and illustrating the progressive stages through which an okra pod passes on its way from the selector mechanism of the drum to the mechanism that conveys it to the knife; and Figure 9 is a sectional view of the drum taken on the line 9—9 of Figure 3.

Continuing to refer to the drawings and particularly to Figures 1 and 2, the numeral 10 identifies a frame, the main uprights of which 11 and 12 are tilted backwardly like an easel with rear supporting stays such as 13. At the upper end of the upright 11 is a journal portion 14 in which is mounted a rotatable shaft 15 upon the front of which is mounted a drum 16.

The frame 10 is tilted as shown in Figure 2 and the drum 16 is shaped as it is in order to facilitate easy loading of the drum from the front with a minimum opportunity for the contents to be tumbled out. Referring to Figure 2, the drum comprises front and rear truncated conical portions 17 and 18 which are joined together by a circumferential band 19 containing a plurality of openings 20. Referring to Figure 1, the circumferential edge 21 defines an opening into which the okra pods may be fed either manually or from some chute.

Continuing to refer to Figures 1 and 2, mounted on the upright 12 and other supporting uprights is a small platform 22 which supports a motor 23. Mounted forwardly of the frame 10 is a gear box 24 which has a driven shaft 25 carrying a pulley 26 driven by a belt 27 operating from a pulley 28 from the drive shaft of the motor 23. The gear box 24 provides two driven shafts 29 and 30. On the shaft 29 is disposed a sprocket 29' upon which is mounted a chain 31 similarly mounted on a similar sprocket 32. On the shaft 30 is a sprocket 33 upon which is mounted a chain 34 mounted also on a similar sprocket 35 disposed on a shaft 36 suitably mounted on the frame 10. The chain 31 drives the drum 16 by means to be described and the chain 34 performs a straightening function for the okra pods.

Examining now the drum in greater detail, and referring to Figures 3 and 9, the two truncated conical portions 17 and 18 are held together by a plurality of evenly spaced plates 37, see Figure 3, which have tapered walls, see Figure 9, so as to engage flush the conical portions 17 and 18. Flanges 38 may be provided on these divider plates to make spot welds with the conical portions 17 and 18. It may be appreciated, therefore, that the circumferential band 20, see Figure 1, of the drum 16 is in reality a series of openings between the V-shaped divider plates 37 with a recess between each opening created by the inner surface of the V-shaped divider plate. It will further be noted that the V-shaped divider plate, referring to Figure 3, has the lead edge on a radius of the drum, the lead edge being the leading side when the drum is rotated clockwise as viewed in Figures 1 or 3. It follows that the lead side which may be numbered 39, see Figure 3, will be substantially horizontal and capable of supporting a pod whenever the radius of the drum is horizontal and is between the second and third quadrants.

Referring to Figure 3, there is tacked to the outside surface of each supporting wall 39 a lug 40 which will be referred to as the driven lug. Mounted on an extension 41 of the frame 10 are a pair of guides 42 and 43, see Figures 9 and 5, as well as Figure 3. These guides are angle irons spaced from each other by a distance sufficient to pass a stem 44 of a pod 45, but sufficiently close together so as to hold the pod 45, irrespective of which end of the pod engages the guides 43 and 42 in the opening 46 of each pocket. Referring to Figure 3, these two guides 42 and 43 are curved to form a circumferential segment through the lower quadrants of the drum. At a point just below the line 7—7 of Figure 3, the outside walls 47 and 48 are bent outwardly into a single plane as illustrated in Figure 8. On reaching this plane, they engage a pair of gripping rails 49 and 50 which extend upwardly as illustrated in Figure 3. At the line 8—8 of Figure 3, the angularity of the walls 51 and 52 with respect to the walls 47 and 48 is further reduced, but as is shown in Figure 8, the walls 51 and 52 do not come closer together but rather, the walls 47 and 48 outwardly overlap the gripping rails 49 and 50. Referring to Figure 4, at the upper ends of the gripping rails 49 and 50 there are mounted a pair of overlapping blades 53 and 54. Continuing to refer to Figure 4, there is mounted on the lower portion of the gripping rails 49 and 50, camming means in the form of two fingers 55 and 56 which are fixedly held at 57 and 58 and adjustably held at 59 and 60. These fingers curve with the circumferential surface of the drum, see Figure 3, and converging toward their upper ends.

It is not necessary to redescribe the main drive including the chain 31, although attention is invited to the fact that the lower sprocket 32 is mounted on a shaft 59 which in turn is mounted on an arm 60 which may be locked by means of a set screw 61 and slot 62 to the frame 10 in the portion 41. This construction makes possible either the tightening of the chain or moving the chain closer or farther away from the drum 16. The chain 31 carries a plurality of drive lugs 63 which are spaced from one another by the same distance that separates adjacent lugs 40 on the drum 16. Each lug is mounted on a pintle.

The straightener chain carries lugs 64 which are spaced from each other by a distance greater than the distance between the lugs 63 but the straightener chain 34 is moved at a greater rate of speed than the chain 31, the relationship being such that a lug 63 will be in substantially the horizontal plane with the lug 64 as the pod is moved into the cutting zone. The cutting zone may be defined as the area around the knives 53.

*Operation*

In operation, referring to Figures 1 and 2, the drum is loaded with okra pods by dumping a quantity of them through the circumferential opening 21. Referring to Figure 3, the drum is rotated clockwise and in so doing the elongated pods tumble into the pockets with either the stem or the small end outwardly directed as chance causes them to fall into the pocket. Being downwardly directed, the pods fall between the guide rails 42 and 43 and are carried upwardly by the revolving drum. After passing through the position indicated by the section line 6—6, the pods are engaged near the outer directed end by the gripping rails 49 and 50 excepting of course if the small end of the pod is outwardly directed, this diameter is such that they are not gripped by the rails 49 and 50. As movement continues on through the position indicated by the section lines 7—7, the upward driving force on the pods being from the pocket member, the gripping rails 49 and 50 exert a firm pressure upon the pods so as to squeeze them and hold them, irrespective of movement of the pockets on the drum. When a pod reaches the position indicated by the numeral 65 in Figure 3, it is engaged by a lug 63 on the chain 31 and carried upwardly. As the pod reaches the position 8—8 in Figure 3, the guide rails 51 and 52 which are flattening out, see Figure 8, press the head against the gripping rails 49 and 50 and maintain the configuration of the head shown in Figure 8 until the head is severed by the knives 53 and 54. During the movement of the pod upwardly, the drooping end of the pod has been picked up by a lug 64 on the straightener chain 34 and this lug has the pod lying in substantially horizontal position at the moment when the pod engages the knife. The straightener chain moves more rapidly than the drive chain 31 and its lugs 64 are spaced farther apart than are the lugs 63, but the two chains are synchronized so that a lug 64 is in alignment with a lug 63 in the cutting zone.

Returning to the point 65 in Figure 3 where the pods having their heads outwardly directed were engaged by the lugs 63 on the chain 31 and carried to the knife, those pods which have their small ends outwardly directed are not engaged by the gripping rails 49 and 50, and consequently continue in their respective pockets in the drum 16. Any tendency of these pods to work their way outwardly is resisted by the fingers 55 and 56, which, as is shown in Figure 4, are directed toward each other and at their outer limits are very close together. This narrowing of the distance between the fingers 55 and 56 has a tendency to positively move the tapering pods inwardly of the drum. Again referring to Figure 3, the pods having their small ends outwardly directed fall downwardly into the lower part of the drum where they will again fall into a pocket.

The severed heads and bodies will be carried on over the upper end of the straightening chain and passed into separate containers.

It will be appreciated that the structure shown can be adapted to behead other types of elongated food objects. In the handling of many fish, it is customary to discard the entire head. The relationship of the head to the body portion of the fish varies with the type of the fish. Where the fish has a head connected to the body by a reduced portion which may correspond to a neck, the present apparatus can be adapted by simply altering the size of the pockets in the drum and the spacing of the guide rails from the drum, and from each other, and the spacing of the gripping rails. Where the fish head is part of a tapering surface from the main body portion, auxiliary means may be necessary for helping hold the fish in the gripping rail. It may be necessary to add a gripping rail. However, the fundamental principles of sorting the fish in a revolving drum, carrying the fish up to a horizontal position where the head is inserted between gripping rails and then carrying the head between the gripping rails to a cutting zone, may be incorporated in a machine to perform these functions.

I claim:

1. A machine for removing an end of elongated food articles comprising a frame, a drum rotatable in an upwardly extending plane, means for radially positioning so as to protrude beyond the circumference of the drum elongated food articles, guide means mounted on the frame and extending upwardly along a portion of the drum's circumferential periphery from a position of lower elevation than the axis of such drum for aligning the food articles within the drum, a pair of gripping rails each having one end positioned between the guide means and the periphery of the drum, a cutting zone adjacent the gripping rails, means for rotating the drum so that the protruding elongated articles will be successively forced between the gripping rails, and means for moving said elongated articles along the gripping rails to the cutting zone.

2. A machine for removing one end of elongated food articles comprising a frame, a sorting member rotatable in an upwardly extending plane, a plurality of circumferentially disposed openings on said sorting member, support means radially positioned inwardly adjacent each opening, guide means mounted on the frame and curving upwardly along a circumferential peripheral portion of the sorting member to a point near a horizontal plane containing the rotational axis of the sorting member shaft, a pair of gripping rails extending upwardly from a portion thereof disposed between the guide means and the periphery of said sorting members, means comprising spaced lugs movable longitudinally upwardly of and between said gripping rails, and cutting means disposed adjacently to a more upward portion of the gripping rails for severing ends from articles carried upwardly along the rails by the lugs.

3. A machine for removing one end of elongated food articles comprising a drum rotatable in an upwardly extending plane, circumferentially spaced openings in and directed radially of said drum, means for positioning the articles in said openings radially of the drum so as to protrude beyond the circumference of the drum, driven lugs projecting radially of the drum from positions respectively adjacent to said openings, a driving chain movable in the same plane as the plane of the drum's circumference, lugs on said driving chain for engaging the driven lugs on the drum, driving means for said chain, guide rails disposed circumferentially around a lower end upwardly extending portion of the drum adjacent the openings, a pair of gripping rails, one on each side of the lugs of the driving chain and with a lower portion thereof positioned between the driving chain and the circumference of the drum, and cutting means stationed at a more upward portion of the gripping rails.

4. A machine for removing an end of elongated food articles comprising a rotatable drum, circumferential openings in said drum, means for radially protruding through said openings elongated food articles, a pair of spaced guide rails circumferentially mounted around the lower portion of the drum, said guide rails being L-shaped in cross section, a pair of substantially straight gripping rails positioned upright with their lower ends between the guide rails and the circumferential holes in the drum, said guide rails continuing adjacent the gripping rails in an upwardly direction, cutting means adjacent a portion of the guide means, and movable lug means positioned between said guide rail and gripping rail for moving any elongated articles which engage the gripping rails upwardly along the gripping rails to a cutting zone.

5. A machine for removing an end of elongated food articles comprising a frame, a drum rotatable in a plane canted with respect to the vertical mounted on said frame, equally spaced circumferential openings in said drum, means for radially holding elongated food articles in said openings, spaced guide rails circumferentially positioned around the lower part of said drum so as to prevent the elongated food articles from dropping out of said openings, a lug carrying chain movable in substantially the same plane as the circumferential openings of the drum with the upward moving side of the chain in driving relationship with the side of the drum, driven lugs on the drum engageable by the lugs on the chain, a pair of gripping rails positioned adjacent a portion of the lug carrying chain and upright with their lower ends between the guide rails and the openings on the drum, and cutting means on the upper end of the gripping rails, whereby elongated food articles moving along the guide rails will pass between the gripping means and be carried by the lugs on the chain upwardly along the gripping rails to the cutting means.

6. A machine for removing an end of elongated food articles comprising a frame, a drum rotatable in a plane canted with respect to the vertical mounted on said frame, equally spaced circumferential openings in said drum, means for radially holding elongated food articles in said openings, spaced guide rails circumferentially positioned around the lower part of said drum so as to prevent the elongated food articles from dropping out of said openings, a lug carrying chain movable in substantially the same plane as the circumferential openings of the drum with the upward moving side of the chain in driving relationship with the side of the drum, driven lugs on the drum engageable by the lugs on the chain, a pair of gripping rails positioned adjacent a portion of the lug carrying chain and upright with their lower ends between the guide rails and the openings on the drum, cutting means on the upper end of the gripping rails, whereby elongated food articles moving along the guide rails will pass between the gripping means and be carried by the lugs on the chain upwardly along the gripping rails to the cutting means, a straightener chain positioned upwardly between the gripping rails and the drum and carrying lugs for moving the free end of elongated food articles in substantially horizontal alignment at the cutting means.

7. A machine for removing an end of elongated food articles comprising a frame, a drum rotatable in a plane canted with respect to the vertical mounted on said frame, equally spaced circumferential openings in said drum, means for radially holding elongated food articles in said openings, spaced guide rails circumferentially positioned around the lower part of said drum so as to prevent the elongated food articles from dropping out of said openings, a lug carrying chain movable in substantially the same plane as the circumferential openings of the drum with the upward moving side of the chain in driving relationship with the side of the drum, driven lugs on the drum engageable by the lugs on the chain, a pair of gripping rails positioned adjacent a portion of the lug carrying chain and upright with their lower ends between the guide rails and the openings on the drum, cutting means on the upper end of the gripping rails, whereby elongated food articles moving along the guide rails will pass between the gripping means and be carried by the lugs on the chain upwardly along the gripping rails to the cutting means, and curved fingers mounted between the gripping rails and the openings on the drum for urging inwardly of the openings of the drum any elongated food articles which are not gripped by the gripping rails.

8. A machine for removing an end of elongated food articles comprising a frame, a rotatable sorting member positioned upright on said frame, means circumferentially of said rotatable member for holding elongated food articles in lateral alignment, a lug carrying chain mounted substantially in the upright plane of the circumference of the rotatable member and in engageable relationship therewith at one point, means associated with the chain for gripping at one end selected elongated food articles from the rotatable member whereby the free end of the elongated member will droop unsupported, a cutting zone adjacent said chain, a second straightener chain carrying lugs adjacent the path of the free drooping end of the food articles moving toward the cutting zone, and means for causing the straightener chain to overrun the other chain just sufficiently so that the two ends of an elongated food article are in a horizontal plane when they reach the cutting zone.

9. A machine for removing an end of elongated food articles comprising a frame, a drum rotatable in a plane canted with respect to the vertical mounted on said frame, equally spaced circumferential openings in said drum, means for radially holding elongated food articles in said openings, spaced guide rails circumferentially positioned around the lower part of said drum so as to prevent the elongated food articles from dropping out of said openings, a lug carrying chain movable in substantially the same plane as the circumferential openings of the drum with the upward moving side of the chain in driving relationship with the side of the drum, driven lugs on the drum engageable by the lugs on the chain, a pair of gripping rails positioned adjacent a portion of the lug carrying chain and upright with their lower ends between the guide rails and the openings on the drum, cutting means on the upper end of the gripping rails, whereby elongated food articles moving along the guide rails will pass between the gripping means and be carried by the lugs on the chain upwardly along the gripping rails to the cutting means, and means for adjusting the movement of the chain with respect to the rotatable drum.

10. A machine for removing an end from elongated food articles, comprising a frame, a rotatable sorting member mounted on said frame for rotation within an upwardly extending plane, circumferentially spaced openings in and directed radially of the sorting member, means for positioning the elongated food articles in said openings radially of the sorting member and with such ends of the articles projecting outwardly of said openings, means engageable with said ends of the articles when they project from said openings and for withdrawing the articles outwardly through said openings, means for removing such ends from the withdrawn articles when they are transferred into severing relation therewith, means for transferring the withdrawn articles into such severing relation with the removing means, and cam means mounted on the frame in a position to be swept past by projecting ends of articles in said openings, said cam means being slideably engageable with the bodies of the articles to displace them from said withdrawing means when the opposite ends of said articles are projected outwardly through said openings.

11. The combination set forth in claim 10, wherein said withdrawing means comprises laterally spaced gripping rails for receiving said ends of the articles slideably therebetween, and wherein said cam means comprises camming fingers extending lengthwise of said rails and disposed between the rails and the drum, and said camming fingers converging in the direction that the articles are swept therepast and diverging away from said rails for camming said articles away from the rails when the opposite ends of said articles are disposed between the rails.

WILLIAM E. URSCHEL.

REFERENCES CITED

The following references are of record in the file of this patent:

UNITED STATES PATENTS

| Number | Name | Date |
|---|---|---|
| 1,400,290 | Johannes | Dec. 13, 1921 |
| 1,362,396 | Cleveland | Dec. 14, 1920 |
| 1,367,546 | Hirth et al. | Feb. 8, 1921 |
| 1,077,899 | Woodring | Nov. 5, 1913 |
| 1,537,574 | Boader | May 12, 1925 |
| 1,814,983 | Urschel | July 14, 1931 |
| 1,889,879 | Rogers | Dec. 6, 1932 |
| 1,993,197 | Urschel | Mar. 5, 1935 |
| 1,454,555 | Nielsen | May 8, 1923 |
| 1,336,991 | Urschel | Apr. 13, 1920 |
| 1,726,032 | Laughlin | Aug. 27, 1929 |
| 2,236,075 | Siemann | Mar. 25, 1941 |